United States Patent
Zhou et al.

(10) Patent No.: US 8,422,264 B2
(45) Date of Patent: *Apr. 16, 2013

(54) DISTRIBUTED FLASH MEMORY STORAGE MANAGER SYSTEMS

(75) Inventors: Wei Zhou, San Jose, CA (US); Chee Hoe Chu, San Jose, CA (US); Po-Chien Chang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,994

(22) Filed: Sep. 5, 2012

(65) Prior Publication Data

US 2012/0327697 A1 Dec. 27, 2012

Related U.S. Application Data

(63) Continuation of application No. 12/754,376, filed on Apr. 5, 2010, now Pat. No. 8,270,194.

(60) Provisional application No. 61/169,032, filed on Apr. 14, 2009, provisional application No. 61/167,450, filed on Apr. 7, 2009.

(51) Int. Cl.
*G11C 5/06* (2006.01)

(52) U.S. Cl.
USPC .................................................. 365/63

(58) Field of Classification Search .............. 365/63
See application file for complete search history.

(56) References Cited

U.S. PATENT DOCUMENTS

| | | | |
|---|---|---|---|
| 5,822,785 | A | 10/1998 | Ikeda et al. |
| 5,897,664 | A | 4/1999 | Nesheim et al. |
| 7,774,564 | B2 | 8/2010 | Kawaguchi |
| 8,270,194 | B2 * | 9/2012 | Zhou et al. ............. 365/63 |
| 2009/0240869 | A1 | 9/2009 | O'Krafka et al. |

* cited by examiner

*Primary Examiner* — Hoai V Ho
*Assistant Examiner* — Pablo Huerta

(57) ABSTRACT

A flash memory storage system may include several modules of flash memory storage manager circuitry, each having some associated flash memory. The modules may be interconnected via the flash memory storage manager circuitry of the modules. The system may be able to write data to and/or read data from the flash memory associated with various ones of the modules by routing the data through the flash memory storage circuitry of the modules. The system may also be able to relocate data for various reasons using such read and write operations. The flash memory storage circuitry of the modules keeps track of where data actually is in the flash memory.

20 Claims, 20 Drawing Sheets

| IC 10 ID | MEM Address |
|---|---|
| Data Payload ||
| Data Payload ||
| Data Payload ||
| ⋮ ||
| Data Payload ||
| | CRC |

FIG. 6

DISTRIBUTED FLASH MEMORY STORAGE MANAGER SYSTEMS

CROSS REFERENCE TO RELATED APPLICATIONS

This application is a continuation of co-pending U.S. patent application Ser. No. 12/754,376, filed Apr. 5, 2010, which claims the benefit of U.S. provisional patent applications No. 61/167,450, filed Apr. 7, 2009, and No. 61/169,032, filed Apr. 14, 2009, which are hereby incorporated by reference herein in their entireties.

BACKGROUND

Larger data storage has been in increased demand in recent years. Data storage based on solid state flash memory offers compelling advantages in terms of read/write throughput, stability, shock and vibration resistance, etc., compared with traditional magnetic disk based storage. Some such solid state flash memory storage may need to be larger than others, and it can therefore be desirable to be able to use various numbers of identical or substantially identical modules to construct such flash memory storage systems in any of a wide range of sizes. It is also important for such flash storage and the associated memory access circuitry to be able to automatically keep track of where all data is in the memory so that the data can be efficiently and reliably accessed. The present disclosure facilities such aspects of electronic data memory construction and/or operation.

SUMMARY

In accordance with certain possible aspects of the disclosure, a plurality of memory circuits may each be connected to a respective one of a plurality of integrated circuits ("ICs"). Each of the ICs may be connected to at least one other of the ICs by inter-IC connections so that an IC exchanges memory circuit data with another IC via the inter-IC connections. Each of the ICs may include memory manager circuitry that comprises a logic block manager for maintaining a unique global identification ("ID") for each block of data contained in any portion of any of the memory circuits, the global ID including a node ID identifying the IC that is connected to the memory circuit containing that block and a logical block number for that block. The memory manager circuitry for each IC may further comprise a translator for maintaining a mapping between (1) the logical block number of each block contained in the memory circuit connected to the IC that includes that translator, and (2) a physical portion ID of a portion of that memory circuit that contains that block. The memory manager for each IC may still further comprise a driver for receiving the physical portion ID from the translator of the IC that includes that driver and accessing the portion of the memory connected to that IC that is identified by that physical portion ID.

In accordance with certain other aspects of the disclosure, in memory circuits as summarized above, each of the ICs ("the source IC") may include circuitry for transferring a block ("the transferred block") accessed by the driver of the source IC to another of the ICs ("the destination IC") for storage in the memory circuitry connected to the destination IC.

In such memory circuits the circuitry for transferring may employ the inter-IC connections.

In accordance with certain still other possible aspects of the disclosure, in memory circuits as summarized above, each of the ICs ("the source IC") may further include circuitry for maintaining a count of how many times each of the other ICs requests a respective block contained in the memory circuit that is connected to the source IC, and circuitry for the transferring a block ("the transferred block") (for which the count for one of the other ICs ("the destination IC") exceeds a threshold value) from the memory circuit connected to the source IC to the memory circuit connected to the destination IC.

Still other possible aspects of the disclosure relate to managing access to a plurality of memory circuits, each of which is connected to a respective one of a plurality of integrated circuits ("ICs"). One of the ICs may be connected to at least one of the other ICs by inter-IC connections so that one IC exchanges blocks of memory circuit data with another IC via the inter-IC connections, each of the ICs ("the source IC") including a memory manager. Each such memory manager may comprise circuitry for maintaining a count of how many times a given IC requests at least one block contained in the memory circuit that is connected to the source IC, and circuitry for transferring a block ("the transferred block") (for which the count for one of the other ICs ("the destination IC") exceeds a threshold value) from the memory circuit connected to the source IC to the memory circuit connected to the destination IC.

In such memory managers the circuitry for transferring may employ the inter-IC connections.

Further features of the disclosure, its nature and various advantages will be more apparent from the accompanying drawings and the following detailed description.

BRIEF DESCRIPTION OF THE DRAWINGS

FIG. 6 is a simplified diagram of an illustrative embodiment of a data packet in accordance with the disclosure.

DETAILED DESCRIPTION

Illustrative embodiments of electronic data memory systems in which the present disclosure can be implemented and practiced are shown in Zhou et al. U.S. patent application Ser. No. 12/728,757, filed Mar. 22, 2010 ("the Zhou et al. reference"), which is hereby incorporated by reference herein in its entirety. FIGS. 1-11 herein are repeated from the Zhou et al. reference and are briefly described below. More detailed description is contained in the text of the Zhou et al. reference.

Figure 1:
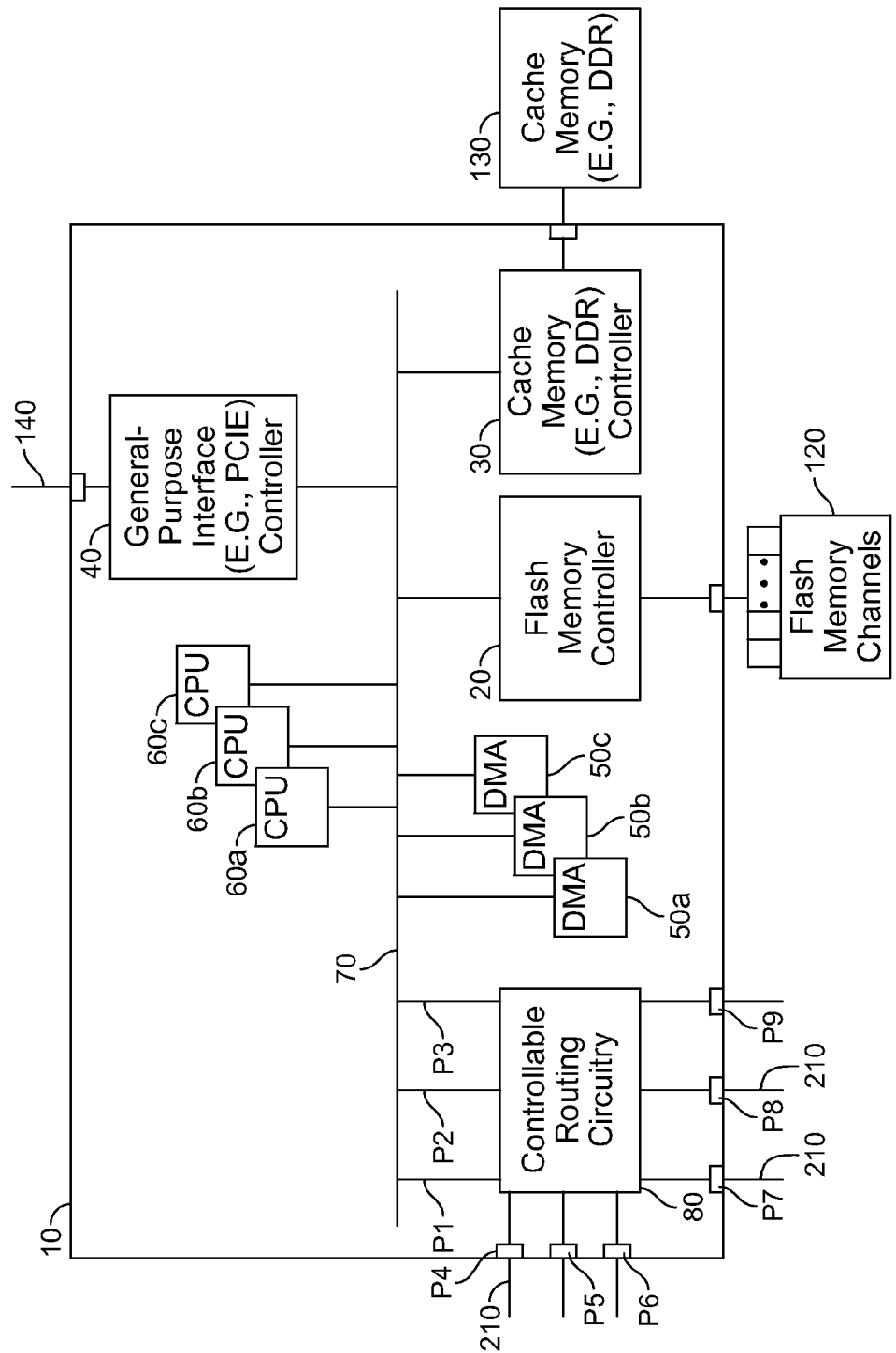
FIG. 1 is a simplified schematic block diagram of an illustrative embodiment of circuitry in accordance with this disclosure.

FIG. 1 shows an illustrative embodiment of an integrated circuit ("IC") 10 that can be used as part of a distributed electronic data storage or memory system in accordance with this disclosure. (As used herein, terms like "circuit," "circuitry," "integrated circuit," "IC," and the like may refer to circuitry with or without software that runs on the circuitry and/or that controls various operations of the circuitry. As just one illustration of this, an "IC" (as that term is used herein) may include one or more processors with or without software that runs in and/or controls various operations of the processor(s).) The circuitry of IC 10 includes flash memory controller 20, cache memory controller 30, interface controller 40, direct memory access ("DMA") circuitry 50, central processing unit ("CPU") circuitry 60, bus circuitry 70, and controllable routing circuitry 80. IC 10 is connected to flash memory channels 120 and cache memory 130. Flash memory channels 120 are typically the relatively large, main memory for IC 10. Cache memory 130 is typically a smaller, temporary memory for IC 10. For example, cache memory 130 may be used for relatively short-term storage of data on its way to or from flash memory 120.

Interface controller 40 can be used for connection of IC 10 to other circuitry (not shown) that may be thought of as external to the memory system of which elements 10, 120, and 130 are a part. For example, the memory system may store data supplied by that external circuitry. Similarly, the memory system may supply its stored data to the external circuitry. Connections 140 (to the external circuitry) may supply to IC 10 data write and/or data read instructions (requests or commands), as well as acting as the conduit for memory data exchange between IC 10 and the external circuitry.

Controller 20 controls writing data to and reading data from flash memory 120. Controller 30 functions similarly for cache memory 130. CPUs 60 provide overall control for IC 10. DMA elements 50 support at least many aspects of memory writing and reading, with less or no involvement of CPUs 60 in such activities. Bus circuitry 70 provides connections between other circuit elements on IC 10. Routing circuitry 80 provides controllable connections (1) between bus circuitry 70 and similar routing circuitry 80 in one or more other instances of IC 10, and (2) between such other instances of IC 10. In a memory system that includes such multiple ICs 10, each IC is preferably constructed as shown in FIG. 1, and each IC is connected to its own flash memory 120 and its own buffer memory 130. Accordingly, such a memory system may be referred to as a distributed memory system, and in general such a memory system may include any number of ICs 10, etc., to provide memories having any of a wide range of sizes.

IC 10 is just one example of how this type of system component can be constructed in accordance with this disclosure. For example, in other embodiments of the disclosure, such an IC may omit some of the elements shown for IC 10 in FIG. 1, and/or such an IC may have other elements that are not shown for IC 10 in FIG. 1.

Routing circuitry 80 may be thought of as a crossbar switch (or at least being like a crossbar switch). In general, such routing circuitry 80 can connect any of circuitry 80's ports (labeled P1-P9) to any other of circuitry 80's ports (although there may be some inter-port connections that cannot be made). Inter-IC connections 210 are used to connect the "external ports" P4-P9 of depicted IC 10 to similar ports of one or more other IC 10 instances in the distributed memory system.

Figure 3:
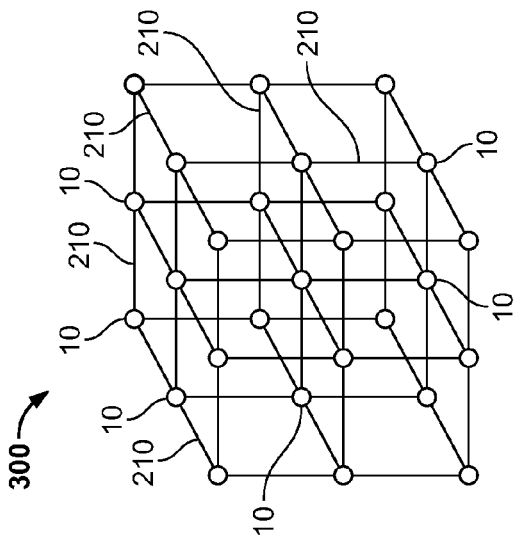
FIG. 3 is similar to FIG. 2 for another illustrative system topology in accordance with the disclosure.
Figure 4:
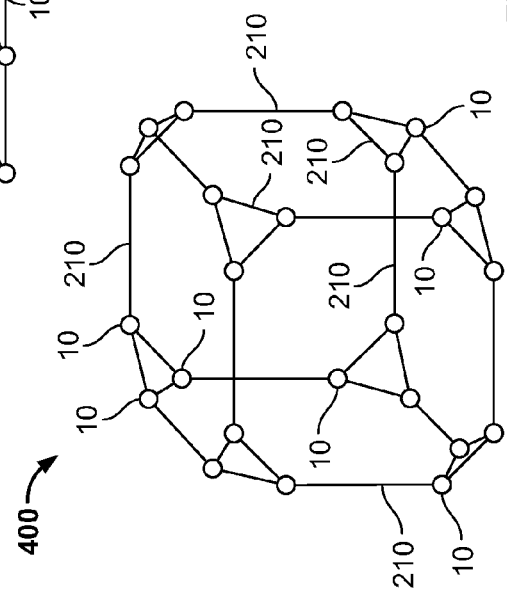
FIG. 4 is similar to FIG. 2 for yet another illustrative system topology in accordance with the disclosure.
Figure 2:
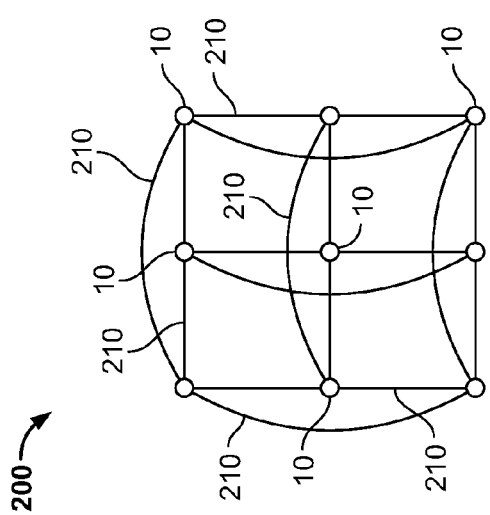
FIG. 2 is a simplified logical diagram of an example of a system topology in accordance with the disclosure.

FIGS. 2-4 show some examples of distributed memory system topologies that can be used (although many other topologies are also usable). Each small circle 10 in each of FIGS. 2-4 represents one instance of an IC 10. Each line 210 in each of FIGS. 2-4 represents an inter-IC connection. The FIG. 2 topology may be referred to as a two-dimensional ("2D") mesh; the FIG. 3 topology may be referred to as a three-dimensional ("3D") mesh; the FIG. 4 topology may be referred to as a triangle cube.

Figure 5:
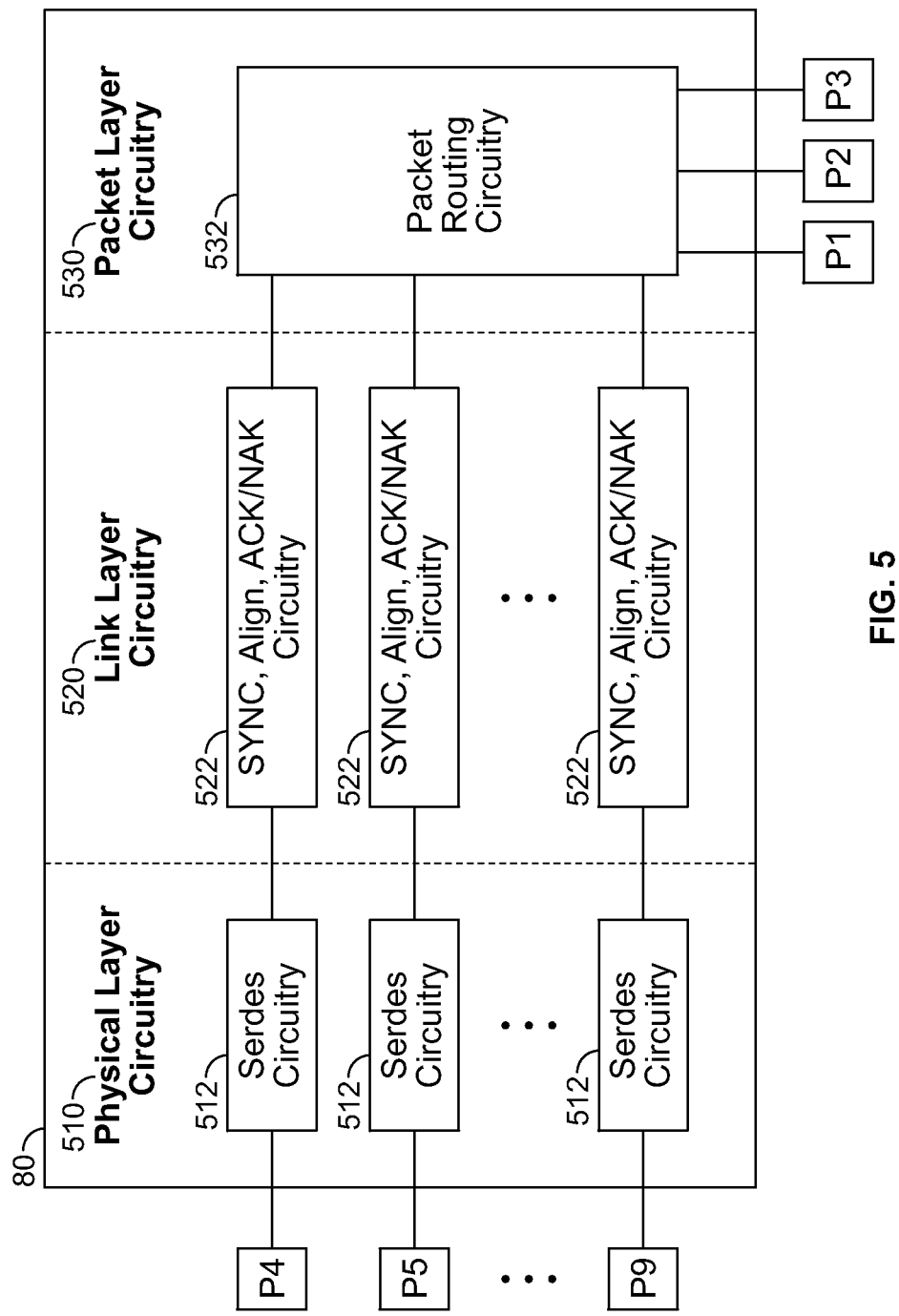
FIG. 5 is a more detailed (but still simplified) schematic block diagram of an illustrative embodiment of a portion of the FIG. 1 circuitry in accordance with the disclosure.

FIG. 5 shows some additional details as to how routing circuitry 80 may be constructed. In this construction, each external port P4-P9 is connected to serializer-deserializer ("SERDES") circuitry 512 in physical layer circuitry 510 of routing circuitry 80. Each SERDES circuitry 512 can convert signals between (1) serial form on inter-IC connections 210 and (2) parallel form for use inside circuitry 80 and elsewhere on IC 10. (Internal ports P1-P3 may be parallel ports, which do not require SERDES circuitry.) SYNC, align, and ACK/NAK circuitry 522 (in link layer circuitry 520 of routing circuitry 80) performs synchronization ("SYNC"), alignment ("ALIGN"), and packet acknowledgement ("ACK/NAK") functions for the signals coming from and/or going to each external port P4-P9. Packet routing circuitry 532 (in packet layer circuitry 530 of routing circuitry 80) performs the actual routing of data packets between selectable different ones of ports P1-P9.

The organization of a typical data packet is shown in FIG. 6. For example, such a packet may include a header, which in turn includes an IC 10 identification ("ID") and memory ("MEM") address for the associated actual "data payload". The data payload follows the header, and is in turn followed by cyclic redundancy check ("CRC") or similar information for helping to make sure that the data payload has been correctly received. The IC 10 ID may also sometimes be referred to as the node ID.

Figure 7:
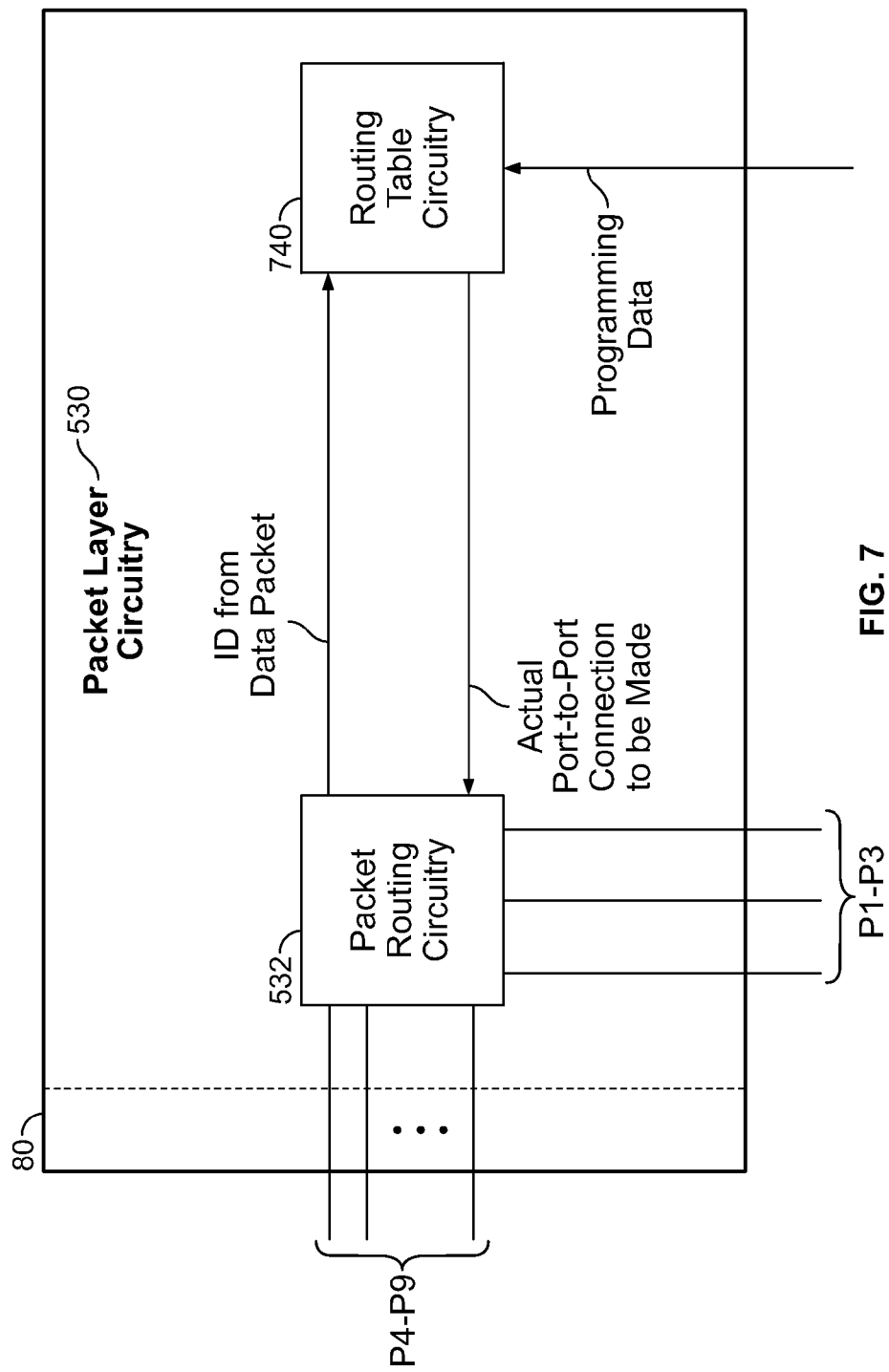
FIG. 7 is similar to FIG. 5, but shows an illustrative embodiment of more possible details in accordance with the disclosure.

FIG. 7 shows that some translation may be needed between the information in the header of a packet and the action that packet routing circuitry 532 needs to take in order to get a packet from one IC 10 to another IC 10. For example, in a system like that shown in FIG. 2, it may be necessary to send a packet from the upper right "node" (IC 10) to the lower left "node" (IC 10). This may be due to the data in the packet being stored in the flash memory 120 connected to upper right IC 10, but being needed to satisfy a request for data received by interface 40 of the lower left IC 10. The packet being discussed can be routed from the "source" or "owner" (upper right) IC 10 to the "destination" (lower left) IC 10 via the upper-most arcuate inter-IC connection 210 to the upper left IC 10, and then via the left-most arcuate inter-IC connection 210 to the lower left IC 10. The header for the packet may include the intended destination (IC 10 ID), but the packet routing circuitry 532 in the upper right IC 10 may need to translate that information into initial information to the effect that a way to get the packet to the lower left destination IC 10 is via the routing circuitry 80 of the upper left IC 10. The routing table circuit 740 (FIG. 7) of the routing circuitry 80 of the upper right source IC 10 may therefore be programmed based on the topology of the system (e.g., FIG. 2) to tell the associated packet routing circuitry 532 that when that circuitry 532 gets a packet that is to be routed to the lower left IC 10, circuitry 532 should in fact route that packet to the upper left IC 10. (The upper left IC will forward that packet on to the lower left destination IC.)

Figure 8:
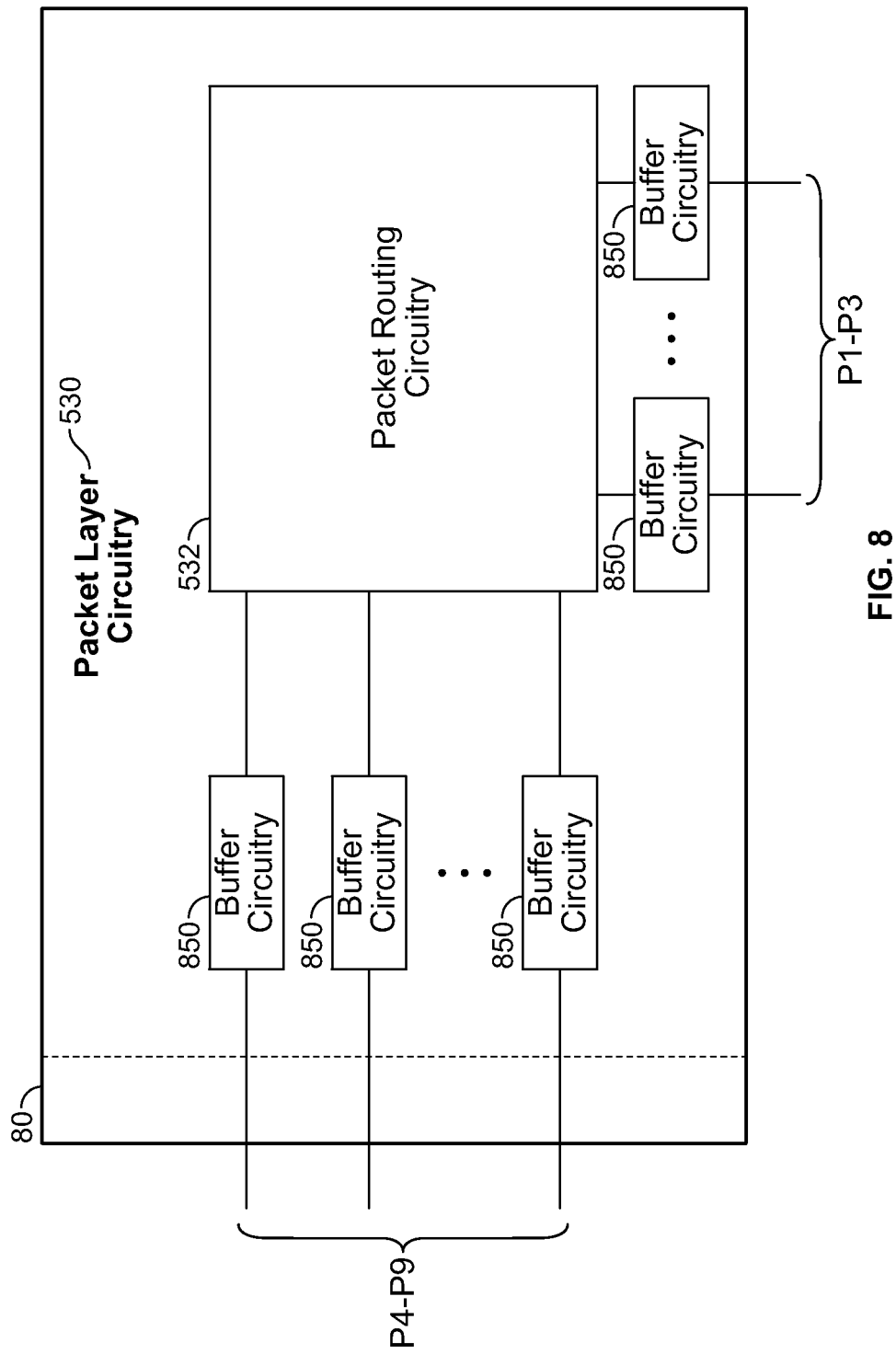
FIG. 8 is again similar to FIG. 5, but shows an illustrative embodiment of still more possible details in accordance with the disclosure.

FIG. 8 shows that packet routing circuitry 532 may include input and/or output buffer circuitry 850 if needed. Buffer circuitry 850 may be input buffer circuitry and/or output buffer circuitry for buffering data in each of the port channels of packet routing circuitry 532.

Figure 9:
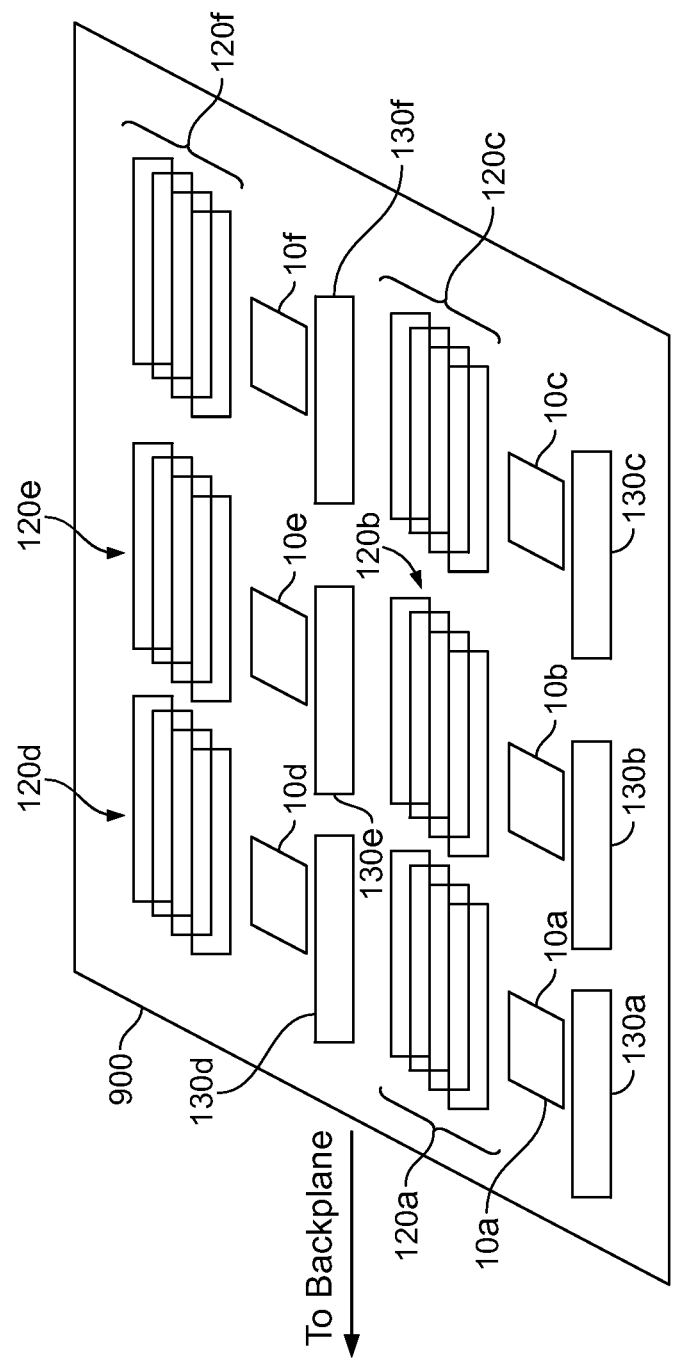
FIG. 9 is a simplified schematic block diagram of an illustrative embodiment of a system (or a representative portion of a system) in accordance with the disclosure.

FIG. 9 shows an example of a possible physical layout of a distributed flash memory system (or a representative portion of such a system) in accordance with the disclosure. Element 900 is a printed circuit board ("PCB"). Six ICs 10*a-f* are mounted on PCB 900. Also mounted on PCB 900 are the flash memories 120*a-f* and cache memories 130*a-f* that are connected to each of ICs 10 (e.g., via circuit traces on PCB 900). Inter-IC connections 210 and external connections 140 (e.g., as in FIG. 1) may also be provided (at least in part) as traces on PCB 900. Multiple instances of PCB 900 may be connected to one another via a backplane on which the PCBs are mounted.

Figure 10:
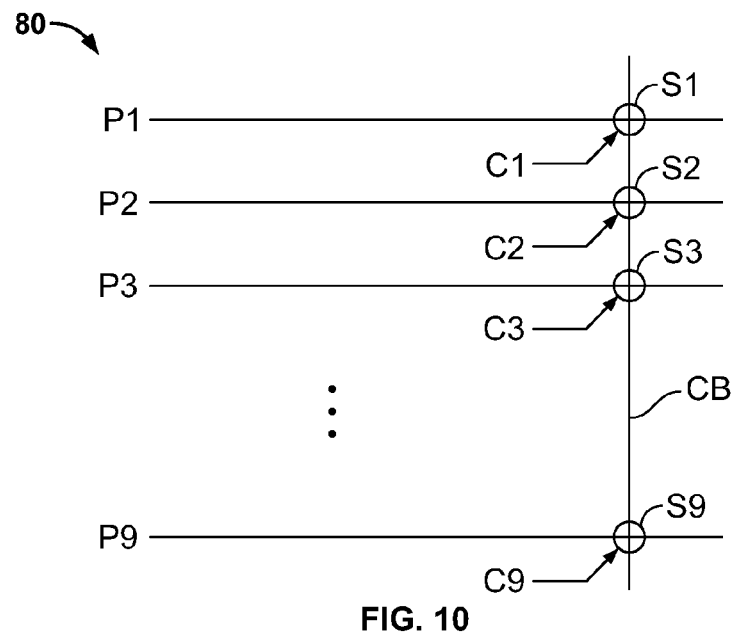
FIG. 10 is a simplified schematic block diagram of an illustrative embodiment of a portion of the FIG. 1 circuitry in accordance with the disclosure.

FIG. 10 shows an illustrative ("crossbar") construction of routing circuitry 80. Any two ports P1-P9 can be connected to one another via crossbar conductor(s) CB. The switches S between CB and each of the two ports that it is desired to interconnect are closed (by assertion of appropriate control signals C). All other switches S are open.

Figure 11:
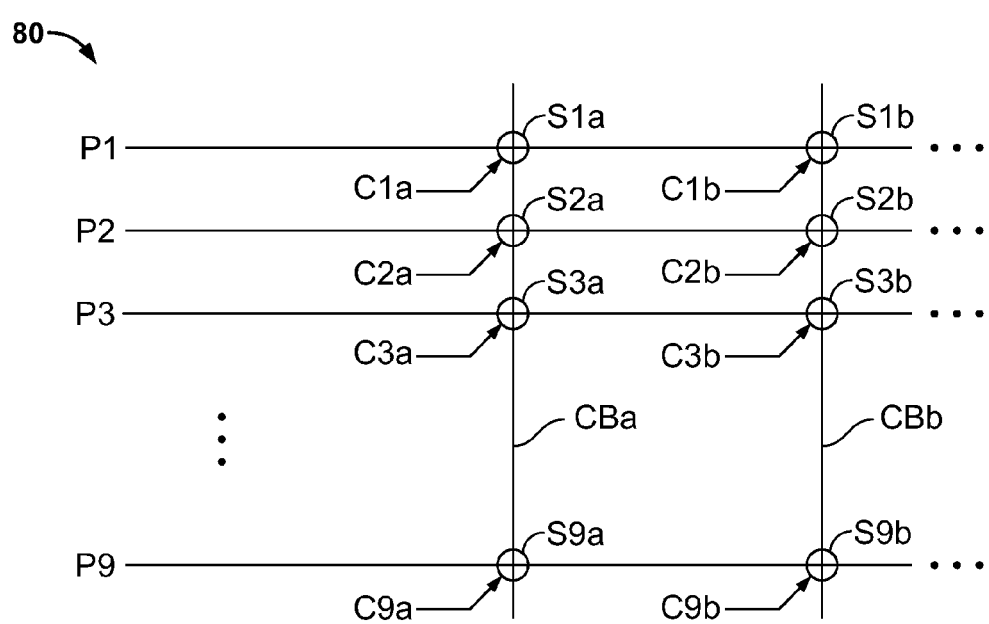
FIG. 11 is a simplified schematic block diagram of an another illustrative embodiment of a portion of the FIG. 1 circuitry in accordance with the disclosure.

FIG. 11 shows that one crossbar network implementation of routing circuitry 80 can concurrently and independently make two or more port-to-port connections. Each such port-to-port connection is made using a respective one of CBa, CBb, etc., and the associated switches Sa, Sb, etc.

The present disclosure provides circuitry and methods (or systems) for providing storage management in a distributed flash storage environment like that illustrated by FIGS. 1-11. A storage manager of this disclosure provides memory data block service across distributed storage nodes (e.g., like ICs 10 and their associated flash 120 and cache 130 memory circuits) to still higher-level structure like a file system or database management system. (A "block" may be any convenient amount of data. For example, a block may be the amount of data that fits in the smallest amount of flash memory 120 that can be separately addressed for data writing or reading. A block will typically be a plurality of data words, but each flash memory 120 can typically hold many such blocks.)

In accordance with certain possible features of the disclosure, the storage manager may map logical data blocks to physical data blocks of the flash memories 120. In accordance with certain other possible features of the disclosure, the storage manager may provide dynamic data block migration across different storage nodes 10/120/130 to improve data access efficiency. The distributed storage manager is preferably circuitry in and/or software running on each of the ICs 10 in the distributed storage system. The storage manager system elements in each IC 10 are preferably tightly coupled to the storage manager system elements in all of the other ICs 10 in the distributed system. This tight coupling can be via the routing circuitry 80 of the ICs and the inter-IC connections 210 between the ICs.

Figure 12:
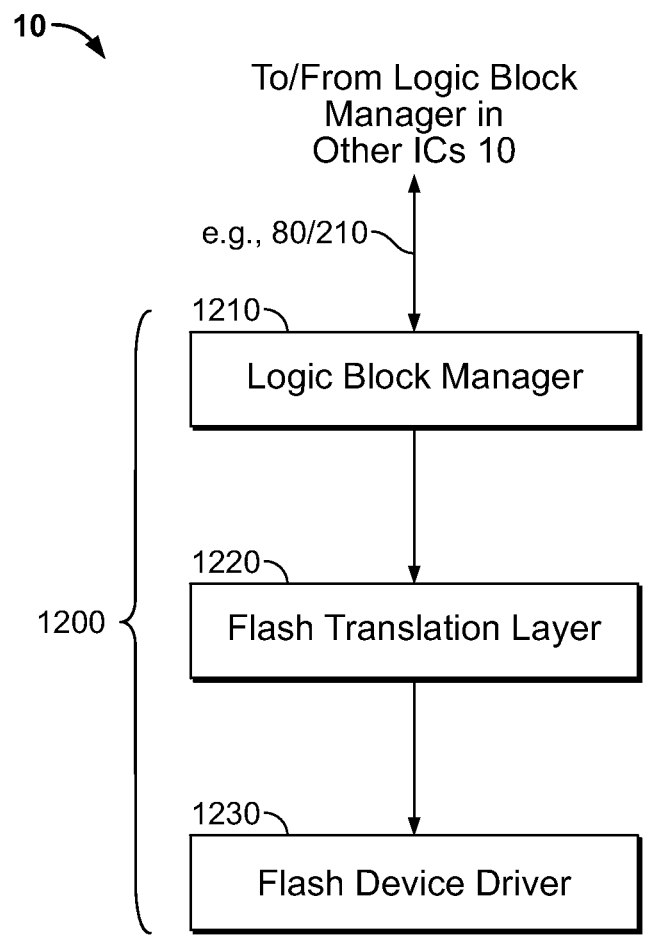
FIG. 12 is a simplified block diagram of an illustrative embodiment of several elements in accordance with certain possible aspects of the disclosure.

An illustrative embodiment of a distributed flash storage manager 1200 is shown in FIG. 12. As shown in this FIG., storage manager 1200 has a layered structure. Flash device driver 1230 is the lowest layer in this structure. The next higher layer is flash translation layer 1220. The upper layer is logic block manager layer 1210. Each of these layers may be circuitry (or may include circuitry) on each instance of IC 10 in the distributed flash storage system. Alternatively, each of these layers may be or may include corresponding firmware and/or software running in circuitry on each instance of IC 10 in the distributed system. (Again, as noted earlier in this specification, terms like "circuitry" as used herein are generic to circuitry alone and to circuitry with suitable firmware and/or software.)

Considering first flash device driver layer 1230, this layer performs hardware-related functions for storage manager 1200. For example, layer 1230 may provide the actual physical device identification ("ID") for the one of several flash devices 120 (connected to the IC 10 including this particular instance of storage manager 1200) that is to be accessed in a particular memory transaction (data write or data read). Layer 1230 may additionally identify the read/write sector in that flash device 120 that is to be accessed. Layer 1230 may still further provide the DMA 50 (FIG. 1) data transfer (e.g., from flash to cache memory or vice versa).

From the foregoing, it will be seen that the outputs of layer 1230 are specific to particular physical locations in the immediately associated memory elements 120/130 that are to be used in the particular memory transaction being carried out. Layer 1230 gets at least the basics of this physical location information from the associated flash translation layer 1220. Note, however, that upper layers 1210 and 1220 preferably give to the associated layer 1230 only information for blocks that are in the memory elements 120/130 that are connected to the IC 10 that includes this instance of elements 1200. Thus one of the functions of upper layers 1210 and 1220 is to effectively filter out (and not pass on to the associated layer 1230) information for any logical blocks that are not physically "owned by" the elements 120/130 connected to the IC 10 including this element 1200 instance. ("Owned by" means that the block is actually stored in the elements 120/130 that "own" that block.)

Flash translation layer 1220 typically provides mapping between each "logical" block of memory data and the physical portion (also sometimes referred to as a block) of the memory resources 120/130 that actually contains ("owns") that block of data. A physical block may be identified by a node (IC 10) identification ("ID"), a flash 120 channel number, a flash 120 device number, a flash 120 block number, and a flash 120 sector number. Each logical block may be identified by a node (IC 10) ID and a logical block number. Flash translation layer 1220 may therefore maintain a mapping table whereby each immediately above-mentioned logical block number can be converted to the appropriately corresponding flash channel number, flash device number, flash block number, and flash sector number (all forming parts of a physical portion ID). Again, if (and only if) these last-mentioned physical location numbers are for a block owned by the memory 120 connected to the IC 10 having the associated node ID, then layer 1220 passes these physical location numbers on to the associated layer 1230 for use in accessing the identified physical portion of the associated memory 120.

Each layer 1220 may also perform related services like block allocation (e.g., when new data is initially written into memory 120), garbage collection (e.g., when a portion of memory 120 no longer contains data that may be needed), and wear leveling (e.g., to avoid excessive over-use of some portions of memory 120, while other portions are not being accessed as frequently).

Logic block manager 1210 provides storage block service to the entire system (i.e., all of the nodes 10/120/130 in an entire system). Each block has a unique global identification ("ID"), which includes a node (IC 10) ID and a logical block number. Any node can request to access any block anywhere in the entire system using the global ID for that block. Based on the node ID portion of the global ID, the request is routed to the correct IC 10 (the "owner" of the requested block). This routing can be performed via the routing circuitry 80 and inter-IC connections 210 needed to get the request from the requesting node to the owner node. When the request reaches the owner node (IC 10), the logic block manager 1210 applies the logical block number part of the request to the flash translation layer 1220 of that IC 10. That layer 1220 then processes the logical block number information as described earlier in this specification, leading ultimately to accessing the requested block in the flash memory 120 that is connected to the owner node IC 10.

Figure 13A:
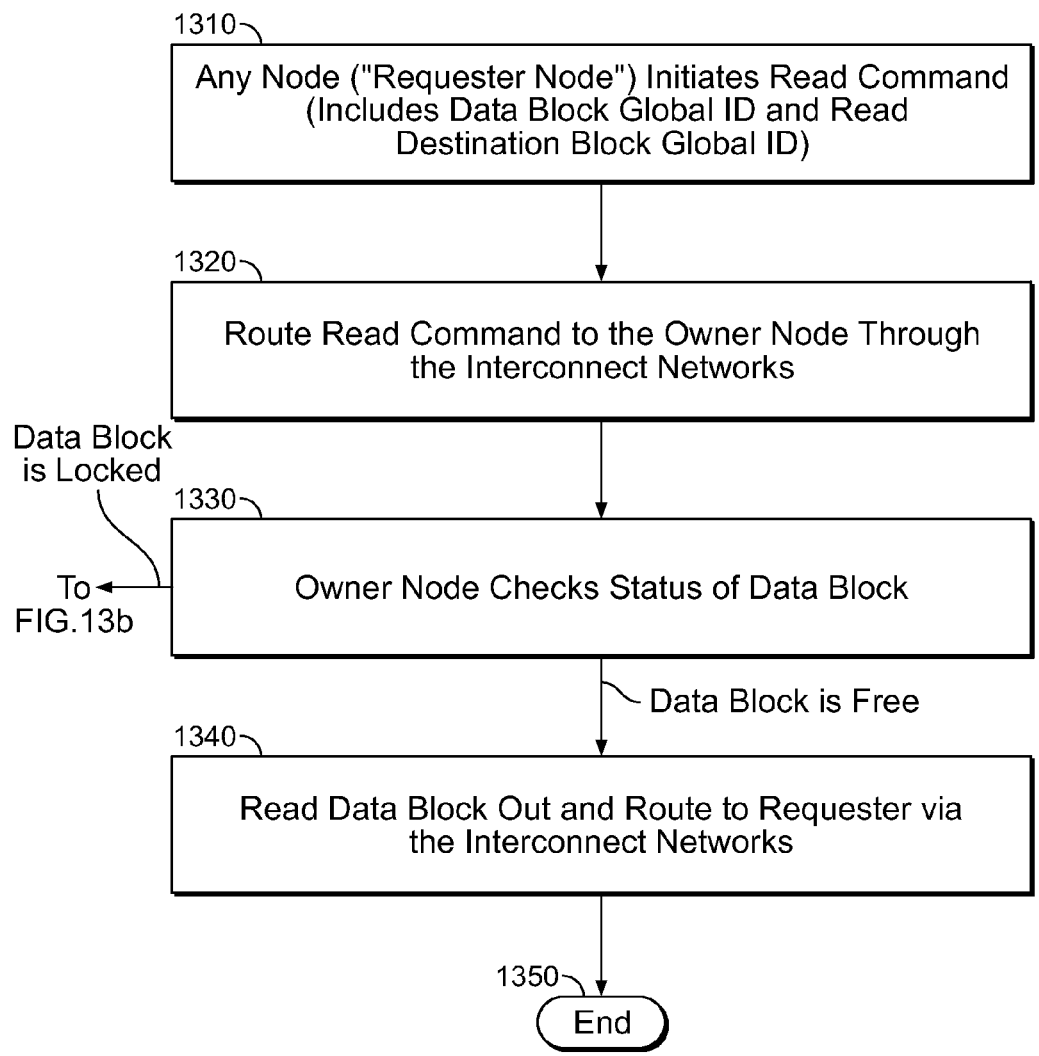
FIGS. 13a and 13b (sometimes referred to collectively as FIG. 13) are a simplified flow chart of an illustrative embodiment of certain possible method aspects of the disclosure.
Figure 13B:
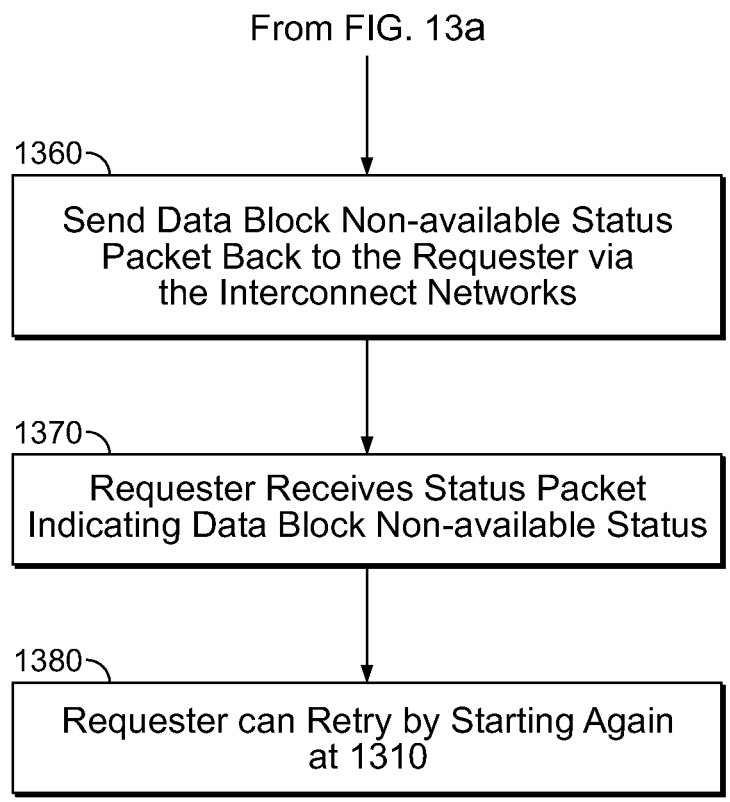

FIGS. 13a and 13b (sometimes referred to collectively as FIG. 13) show an illustrative embodiment of how a read command or request may be handled in distributed flash memory systems in accordance with this disclosure. At 1310, any node (IC 10) may initiate a read command. The node initiating such a read command may be referred to as the "requester node" or "the requester." The read command may include the global ID of the requested data block.

At 1320 the read command is routed to the node (IC 10) that is the "owner" of the requested data block. This routing can take place through the interconnect networks 80/210 of the system. As noted earlier, the global ID of each data block includes the node ID of that block. The node ID identifies the node that is the owner of the block, which enables interconnect networks 80/210 to route the read command to the proper node in the system.

At 1330 the owner node checks the status of the data block identified in the read command. Two outcomes of such a check are possible. First, it may be found that the data block is "free" (meaning, e.g., that no node is currently writing to that block). Alternatively, it may be found that the data block is "locked" (meaning, e.g., that some node is currently writing to that block). If the node is free, control passes from 1330 to 1340. We will first continue with this branch from 1330. Later we will come back to the other branch from 1330.

At 1340 the circuitry of the owner node reads the requested data out of the block identified in the read command. This will typically require processing the logical block number portion of the global ID of the requested block through the storage manager 1200 (FIG. 12) of the owner node as described earlier in this specification. Also at 1340 the data block thus read out is routed to the requester via the interconnect networks 80/210 of the system. The read data may thus get back to the requester via the same route established for the read request, but in the opposite direction. This satisfies the read request, and so the read protocol can end at 1350.

Returning now to the other branch from 1330, if the data block is locked, control passes from 1330 to 1360. At 1360, the owner node sends a data block non-available status packet back to the requester via the interconnect networks 80/210. At 1370 the requester receives this non-available status packet. At 1380 the requester can try again to satisfy its read request by restarting the protocol at 1310.

Figure 14A:
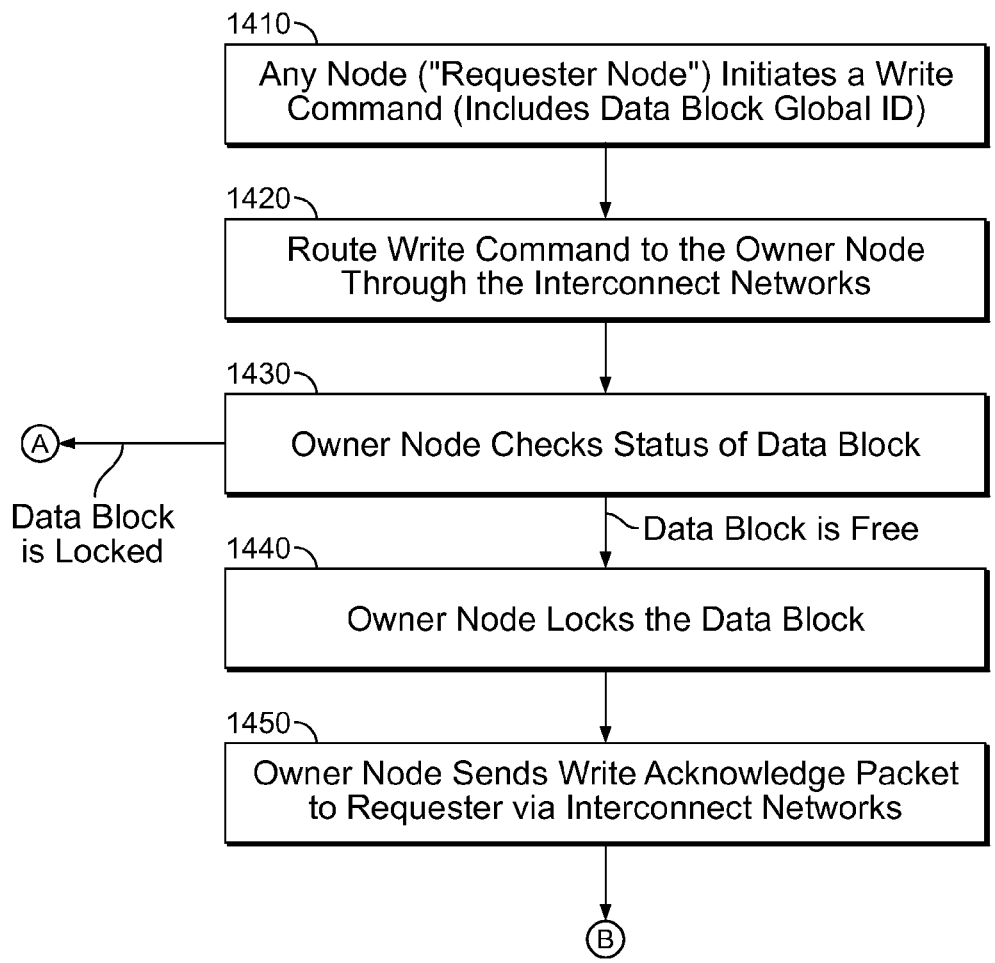
FIGS. 14a-c (sometimes referred to collectively as FIG. 14) are a simplified flow chart of an illustrative embodiment of certain other possible method aspects of the disclosure.
Figure 14B:
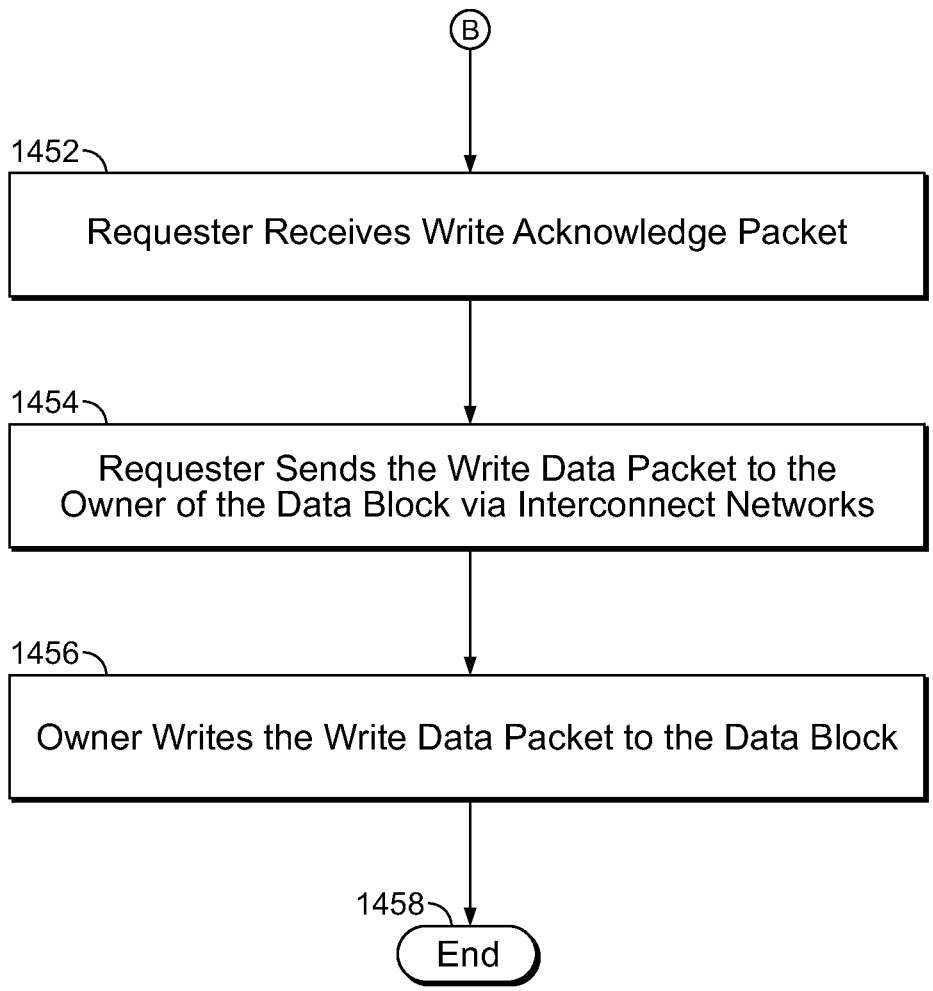
Figure 14C:
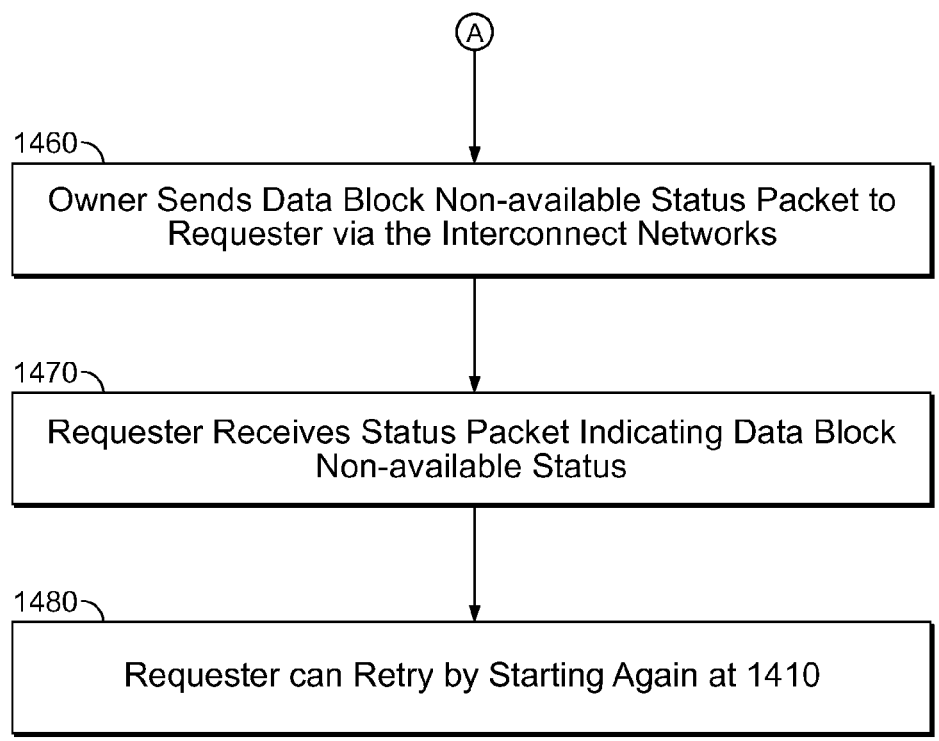

FIGS. 14a-c (sometimes referred to collectively as FIG. 14) show an illustrative embodiment of how a write command or request may be handled in distributed flash memory systems in accordance with the disclosure. At 1410, any node (IC 10) can initiate a write command. The node initiating such a write command may be referred to as the "requester node" or "the requester." The write command may include the global ID of the data block into which it is desired to write data. Any node (IC 10) in the system may be the "owner" of this data block, where "owner" has the same meaning as used elsewhere in this specification.

At 1420 the write command is routed to the owner node. This routing can take place through the interconnect networks 80/210 of the system. As noted earlier, the global ID of each data block includes the node ID of that block. The node ID identifies the node that is the owner of the block, which enables interconnect networks 80/210 to route the write command to the proper node in the system.

At 1430 the owner node checks the status of the data block identified in the write command. If the data block is free (as explained earlier), control passes from 1430 to 1440. If the data block is locked (as also explained earlier), control passes from 1430 to 1460.

At 1440 the circuitry of the owner node sends a write acknowledge packet back to the requester via interconnect networks 80/210. At 1452 the requester receives the write acknowledge packet. At 1454 the requester sends the write data packet (i.e., the actual data to be written) to the owner via interconnect networks 80/210. At 1456 the owner writes the write data packet to the data block. At 1458 the write protocol ends.

Returning to the other branch from 1430, at 1460 the owner sends a data block non-available status packet to the requester via interconnect networks 80/210. At 1470 the requester receives the non-available status packet. At 1480 the requester can retry the write command by starting again at 1410.

Figure 15A:
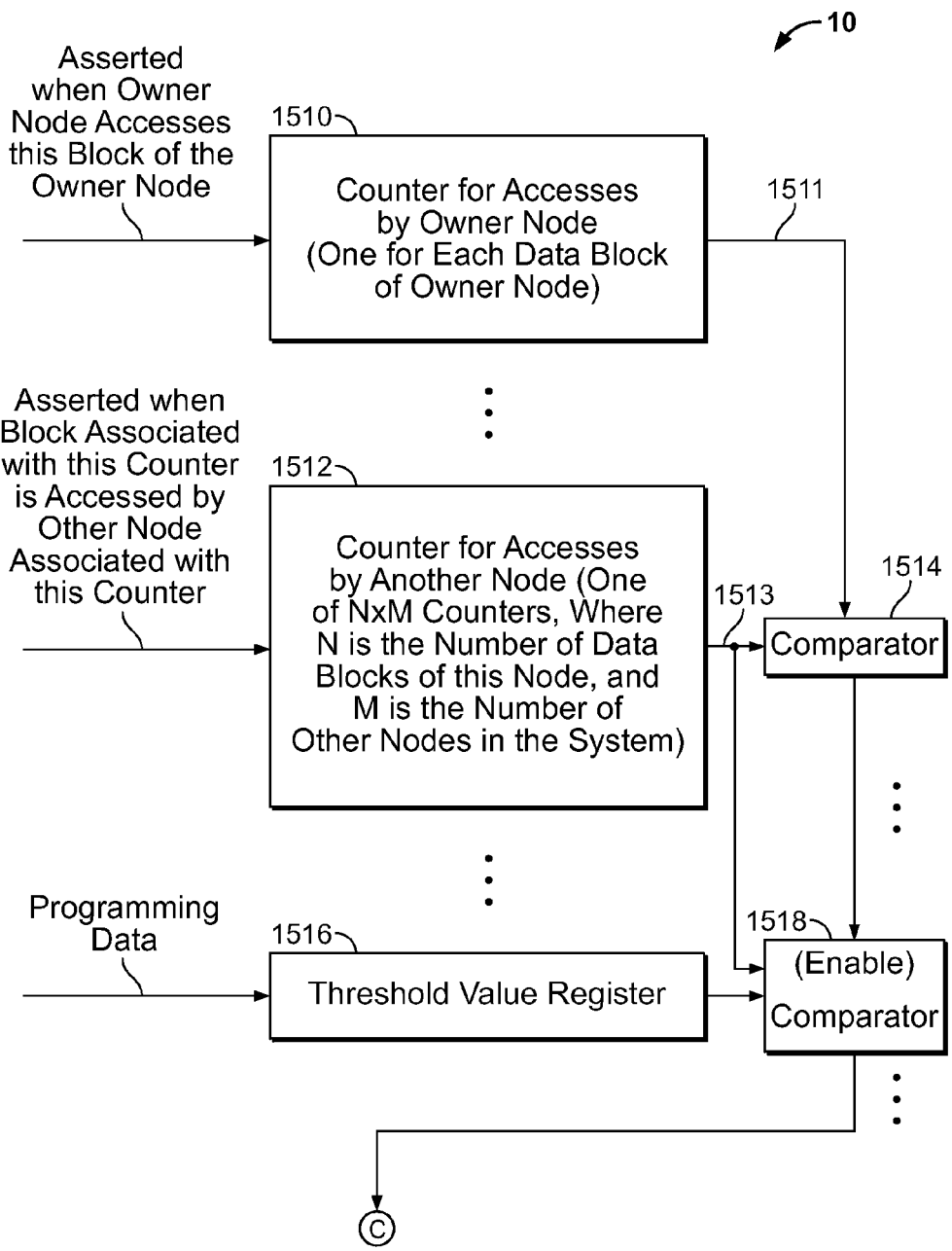
FIGS. 15a-c (sometimes referred to collectively as FIG. 15) are a simplified schematic block diagram of an illustrative embodiment of circuitry in accordance with certain possible aspects of the disclosure.
Figure 15B:
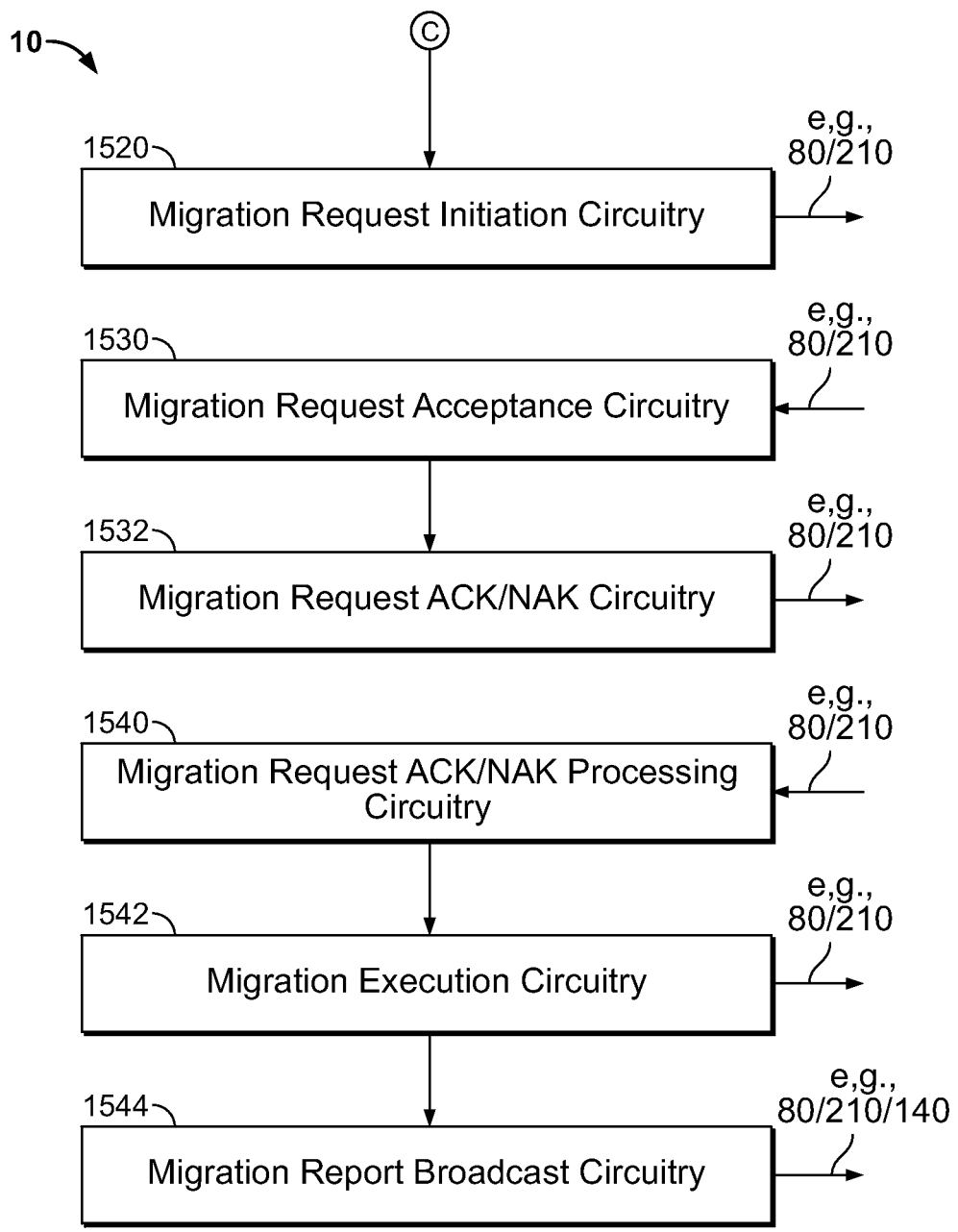
Figure 15C:
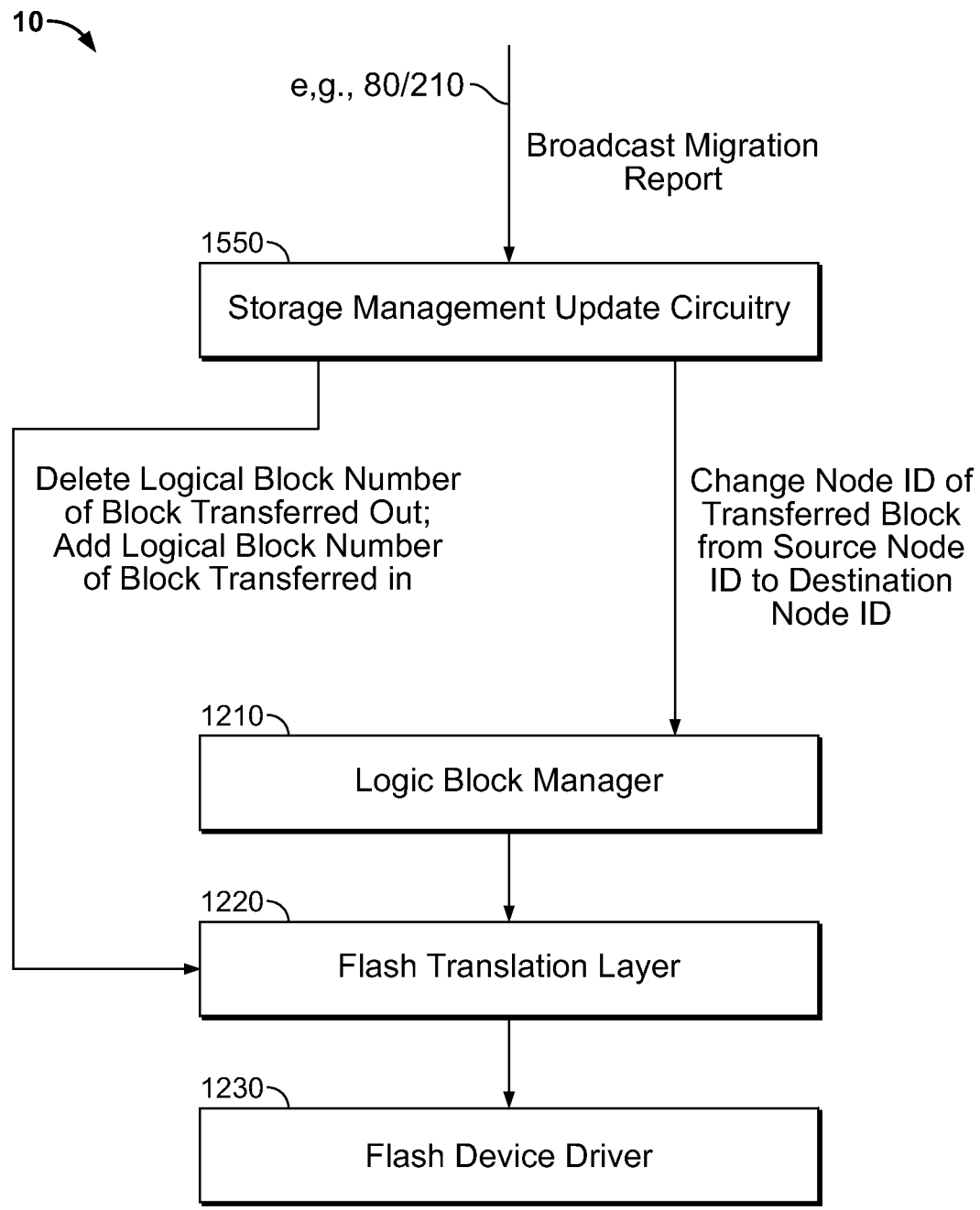

FIGS. 15a-c (sometimes collectively referred to as FIG. 15) show an illustrative embodiment of circuitry (or equivalent structure) in accordance with another possible aspect of this disclosure. This is structure for providing dynamic data block migration (e.g., within a distributed flash memory system such as is described elsewhere in this specification). Each IC 10 in such a system may include an instance of the FIG. 15 structure. This structure may be dedicated circuitry on the IC, firmware on the IC, software running on more general-purpose circuitry on the IC, or any combination of the foregoing. To simplify the following discussion, it will be assumed that FIG. 15 shows circuitry (which "circuitry" terminology is again consistent with the generic use of that term herein to refer to circuitry alone or to circuitry with or running software).

The FIG. 15 circuitry includes one counter 1510 for each data block (e.g., in flash memory 120) connected to the node (IC 10) that includes those counters 1510. Each counter 1510 counts the number of times that this node accesses the associated data block owned by this node.

The FIG. 15 circuitry also includes M more counters 1512 for each of the N data blocks owned by this node. M is the number of other nodes (ICs 10) in the system. For each data block, each of that data block's M counters 1512 is associated with a respective one of the M other nodes in the system. Each counter 1512 counts the number of times that the associated other node accesses the associated data block.

There is one comparator 1514 associated with each of the counters 1512. (It will be understood that the number of comparators 1514 can be reduced by time-sharing the reduced number of comparators. For example, a single comparator 1514 can be time-shared by all of counters 1512. To simplify the discussion, however, it will be assumed that there is a separate comparator 1514 for each counter 1512.) Each comparator 1514 compares (1) the output 1513 of a respective one of counters 1512, and (2) the output 1511 of the counter 1510 for the same data block that the output 1513 relates to. If (and only if) output 1513 is greater than output 1511, then the comparator 1514 applies an enabling signal to a respective one of comparator circuits 1518. (Output 1511 is the count currently registered by the associated counter 1510. Output 1513 is the count currently registered by the associated counter 1512.)

There is one comparator 1518 for each comparator 1514. (Again, the number of comparators 1518 can be reduced by time-sharing as described above in connection with elements 1514.)

When enabled, each comparator 1518 compares the output 1513 of a respective one of counters 1512 to a threshold value output by threshold value register 1516. For example, any desired threshold value may be programmed into register 1516. If (and only if) the output 1513 exceeds the threshold value, comparator 1518 produces an output for enabling migration request initiation circuitry 1520.

The significance of the foregoing is as follows. Whenever the count of accesses of a data block by a non-owner node exceeds both (1) the number of accesses of the data block by that data block's current owner node and (2) a predetermined threshold number of accesses (from register 1516), an attempt will be made to migrate (transfer) that data block from the current owner node to the above-mentioned other node in order to make that other node the new owner of the data block. This tends to give ownership of each data block to the node that is making most frequent use of (i.e., most frequently accessing) that data block. This can greatly increase the access efficiency of the distributed memory system as a whole. The data block migrations needed to produce this result are carried out by elements 1520, 1530, etc. in FIG. 15b, as will now be described.

When circuitry 1520 is enabled as mentioned earlier, circuitry 1520 knows (by knowing which comparator 1518 enabled it) which data block ("the transferred block") needs to be migrated, and to which other node ("the destination node") that data block needs to be migrated. Circuitry 1520 therefore sends a migration request to the destination node (e.g., via interconnection networks 80/210). A migration request (like a read request or a write request) can have the characteristics of a data packet (e.g., as in FIG. 6 and described earlier in this specification). Thus, for example, a migration request may have a header including the ID of the destination IC, which enables the interconnect resources 80/210 of the system to route the migration request to the destination IC. This is similar to what is done for data packets (e.g., as in FIG. 6), read requests, and write requests.

As mentioned earlier, each node (IC 10) includes all of the elements shown in FIG. 15. Therefore the illustrated node depicted (in part) in FIG. 15 also includes the elements needed to enable that node to be a destination node. The destination node elements can accordingly also be described in connection with FIG. 15 (even though in any actual data block migration two different nodes (i.e., a "source node" originating the migration, and the destination node receiving the migration) will be involved. Thus the migration request from the source node is received by migration request acceptance circuitry 1530 in the destination node. This circuitry 1530 checks to see whether or not the memory (e.g., 120) connected to that node can receive the data block proposed for transfer (migration). Migration request ACK/NAK (acknowledge/non-acknowledge) circuitry 1532 of the destination node sends back to the source node either an ACK signal (meaning that the destination node can receive the data block transfer) or a NAK signal (meaning that the destination node cannot receive the data block transfer).

In the source node, migration request ACK/NAK processing circuitry responds to an ACK (and only an ACK) by enabling migration execution circuitry 1542 to actually send the data block to be migrated to the destination node. (A NAK terminates the attempt to migrate the data block.) When the data block migration has been successfully accomplished, migration report broadcast circuitry 1544 is enabled to send a broadcast message or report notifying all nodes about the migration of the transferred block. For example, the broadcast migration report allows the circuitry 1200 (FIG. 12) in all nodes (ICs 10) in the system to update the records the nodes maintain as to the locations of all data blocks in the system. This is shown in more detail in FIG. 15c, which is discussed in the next paragraph. Upper layer system components (e.g., file system, database management system, etc., components (not shown)) may also be notified about the migration of the block (e.g., via an external link 140 (FIG. 1)). Although FIG. 15b shows elements 1542 and 1544 operating as part of source node operations, they may alternatively operate as part of destination node operations.

As shown in FIG. 15c, each IC 10 further includes storage management update circuitry 1550 for receiving and processing a migration report that has been broadcast as discussed in connection with element 1544 in FIG. 15b. When such a migration report is received, circuitry 1550 causes the logic block manager 1210 in the IC 10 that includes that circuitry 1550 to change in that block manager's records (mapping information) the owner node ID of the transferred block from the source node ID to the destination node ID. Similarly, circuitry 1550 in the source node causes the associated source node flash translation layer 1220 to delete from that translation layer's records (mapping information) the logical block number of the transferred block, while the circuitry 1550 in the destination node causes that circuitry's associated destination node flash translation layer 1220 to add to its records (mapping information) the logical block number of the transferred block. (As an alternative to making these changes to the translation layer 1220 records in response to the broadcast migration report, these changes could instead be made as part of the data migration operation itself, because these changes only affect the translation layers in the source and destination nodes involved in the migration.) Flash device driver 1230 in FIG. 15c has already been fully described in connection with FIG. 12.

Figure 16A:
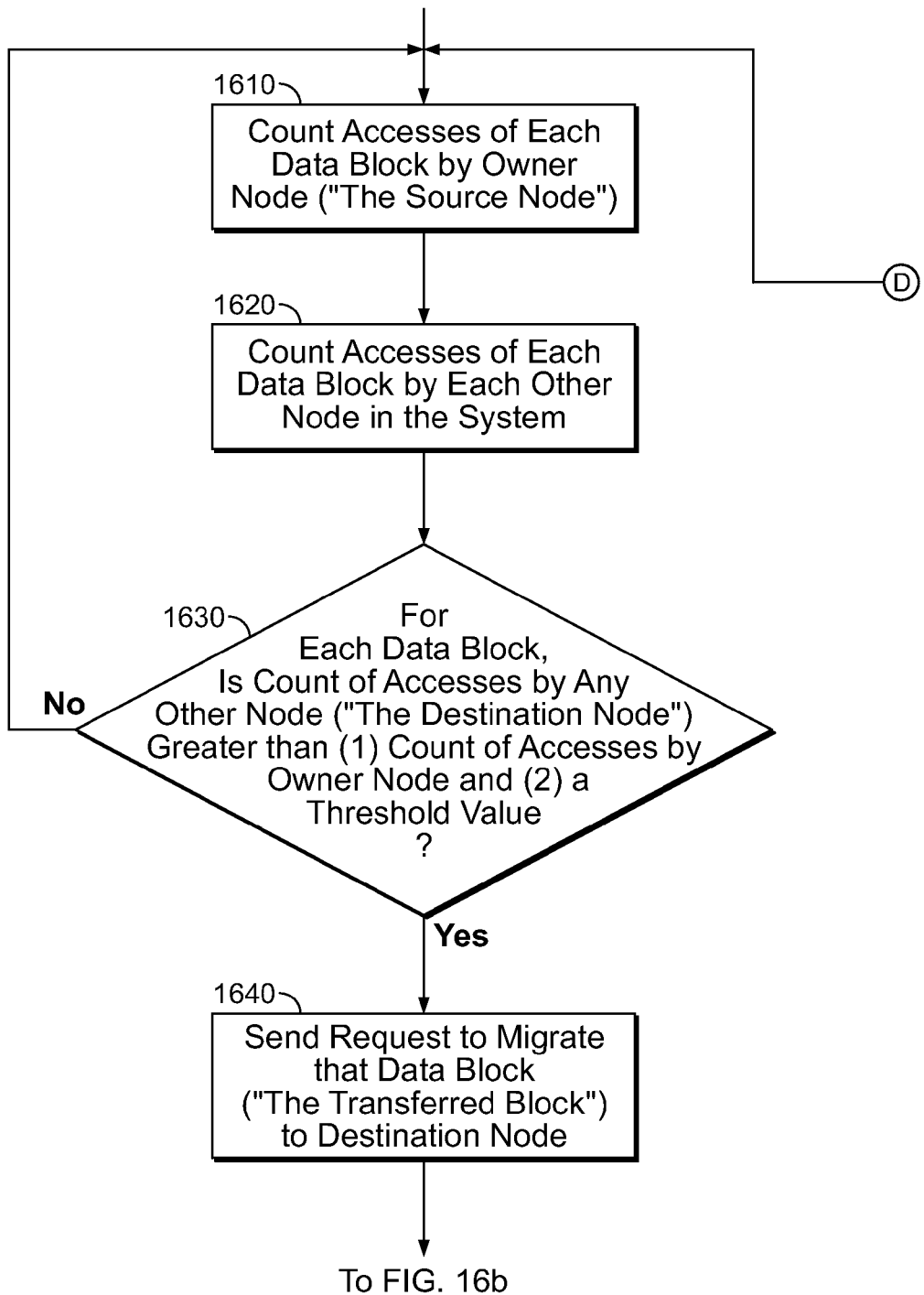
FIGS. 16a-c (sometimes referred to collectively as FIG. 16) are a simplified flow chart of certain, still other possible method aspects of the disclosure.
Figure 16B:
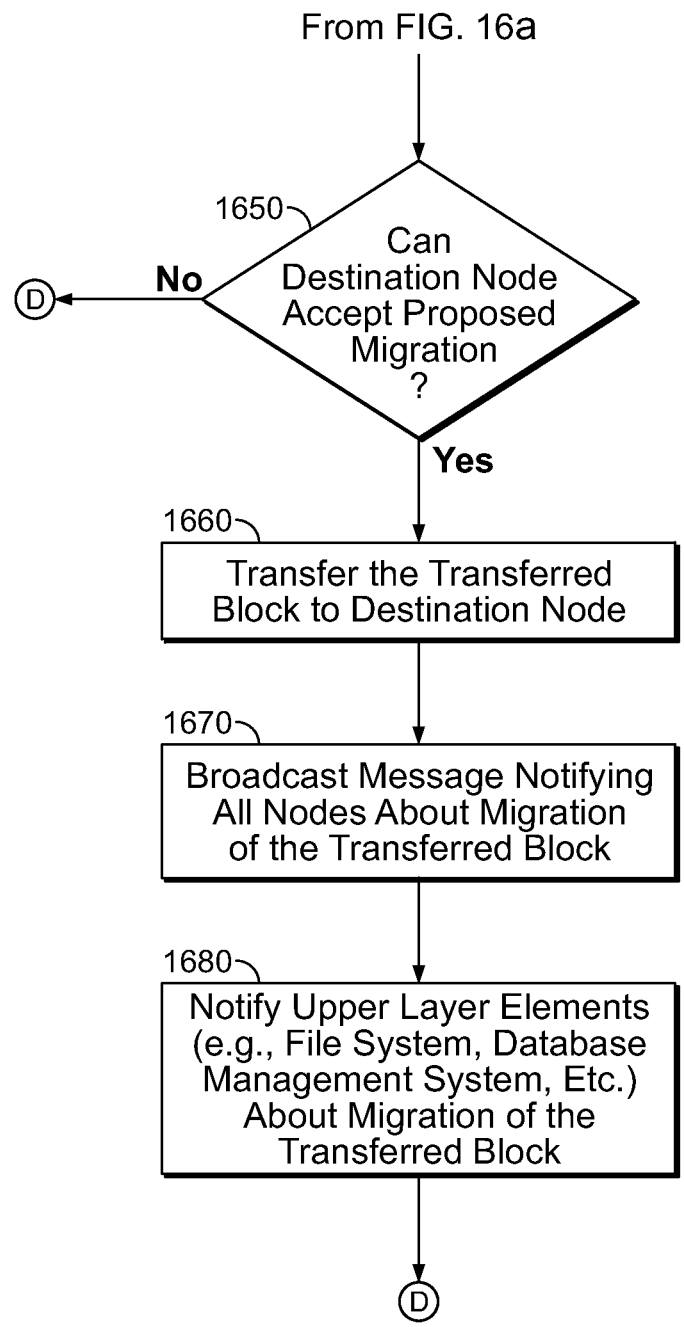
Figure 16C:
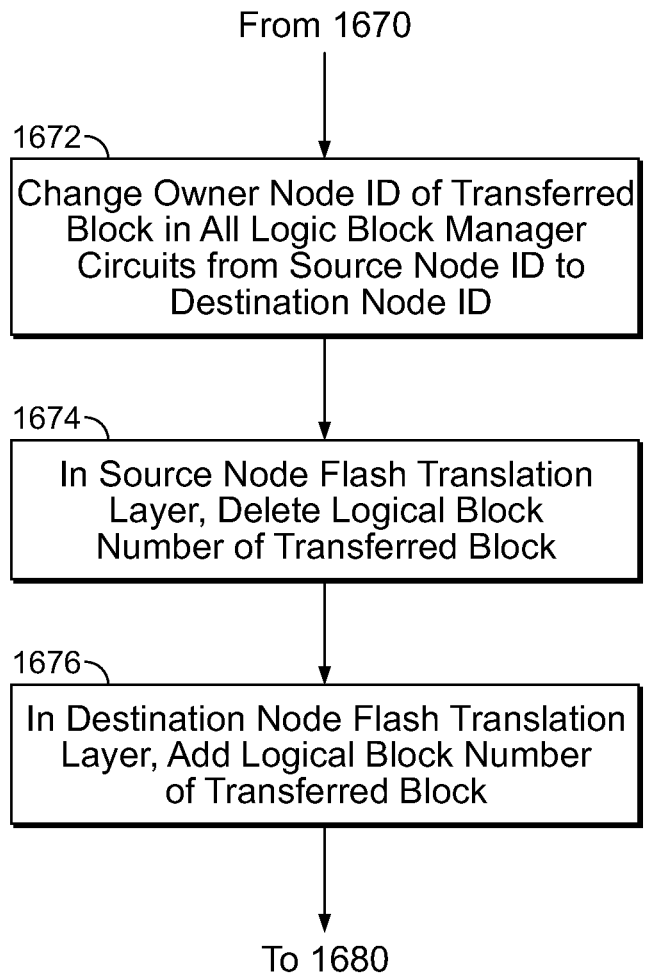

FIGS. 16a-c (sometimes referred to collectively as FIG. 16) show illustrative embodiments of dynamic data block migration methods that can be performed, e.g., by circuitry of the type shown in FIG. 15 in accordance with this disclosure. Each node (IC 10) in a distributed memory system may perform the FIG. 16 method.

At 1610 each access of each data block by the owner node of that data block is counted.

At 1620 each access of each data block by each other node is separately counted.

At 1630 each count from 1620 is compared to (1) the count (from 1610) of accesses of the same data block by the node that currently owns that data block, and (2) a threshold value. For any data block whose count (from 1620) for some non-owner node exceeds both the owner node count (from 1610) and the threshold, control passes from 1630 to 1640. The last-mentioned data block may be referred to as the transferred block, and the last-mentioned non-owner node may be referred to as the destination node. (If there is no "yes" outcome from 1630, control passes from 1630 back to 1610.)

At 1640 the current owner block ("the source block") sends a request to transfer the transferred block to the destination node.

At 1650 the destination node determines whether or not it can accept the proposed transfer. If not, control passes back to 1610 and the proposed transfer does not take place. If the destination block can accept the proposed transfer, control passes to 1660.

At 1660 the source node transfers the transferred block to the destination node. At 1670 a message or report is broadcast to all nodes (ICs 10) notifying them about the transfer of the transferred block. At 1680 upper layer elements such as file system elements, database management system elements, etc., are notified about the migration of the transferred block.

FIG. 16c shows in more detail operations that may be performed in ICs 10 in response to a message broadcast as discussed above in connection with element 1670 in FIG. 16b. The FIG. 16c operations are performed to update the records (mapping information) in elements 1210 and 1220 (e.g., FIGS. 12 and 15c) in view of the data block migration (transfer) that has taken place. At 1672 the record of the owner node ID of the transferred block is changed (from the source node ID to the destination node ID) in all logic block manager circuits 1210 throughout the system. At 1674 the flash translation layer 1220 in the source node has that translation layer's records updated by deleting the logical block number of the transferred block. At 1676 the flash translation layer 1220 in the destination node has that translation layer's records updated by adding the logical block number of the transferred block. (Again, a possible alternative is to perform operations 1674 and 1676 in connection with the actual data migration, rather than in response to a broadcast migration report.)

Throughout this disclosure, references to "data," "information," or the like refer to physical embodiments of such data, information, or the like (e.g., as electrical signals, stored electrical charge, particular magnetic states of magnetizable media, etc.). Also throughout this disclosure (as has already been said), terms like "circuit," "circuitry," "integrated circuit," "IC," and the like can refer to combinations of hardware and software.

It will be understood that the foregoing is only illustrative of the principles of the disclosure, and that various modifications can be made by those skilled in the art without departing from the scope and spirit of the disclosure. For example, systems can be constructed with any number of nodes (ICs 10) to provide distributed flash memory systems of any desired size. As another example of modifications within the scope of this disclosure, elements and/or functions that are shown herein as separate may be combined into single elements and/or functions; and elements and/or functions that are shown herein as integral or unitary may be subdivided into two or more separate sub-elements or sub-functions.

What is claimed is:

1. A system comprising:
a plurality of integrated circuits ("ICs"), wherein at least one IC of the plurality of ICs comprises:
   memory circuitry; and
   memory manager circuitry configured to:
      maintain a unique global identification ("ID") for a data block stored by the plurality of ICs, wherein the global ID for the data block comprises:
         a node ID identifying an IC of the plurality of ICs which stores the data block, and
         a logical block number of the data block;
      maintain a translation mapping between a logical block number of a data block stored locally in the memory circuitry of the at least one IC and a physical portion ID of a portion of the memory circuitry of the at least one IC containing the locally stored data block; and
      access the portion of the memory circuitry of the at least one IC containing the locally stored data block in response to receiving a physical portion ID of the locally stored data block.

2. The system of claim 1, wherein a first IC of the plurality of ICs is configured to:
receive a request from an external source for a data block identified by a global ID of the requested data block; and
determine a node ID and a logical block number of the requested data block based on the global ID of the requested data block.

3. The system of claim 2, wherein the first IC is further configured to:
retrieve the requested data block from a memory circuitry of the first IC in response to determining that the node ID of the requested data block is the same as a node ID of the first IC; and
route the retrieved requested data block to the external source.

4. The system of claim 2, wherein the first IC is further configured to:
route the request from the external source for the data block to a second IC of the plurality of ICs in response to determining that the node ID of the requested data block is different from a node ID of the first IC.

5. The system of claim 4, wherein the first IC is further configured to:
select a route for routing the request based at least in part on the node ID of the requested data block.

6. The system of claim 4, wherein the first IC is further configured to:
select a route for routing the request based at least in part on a topology of interconnections between ICs of the plurality of ICs.

7. The system of claim 4, wherein the second IC is configured to:
receive the request from the external source for the data block routed to the second IC by the first IC;
retrieve the requested data block from a memory circuitry of the second IC in response to determining that the node ID of the requested data block is the same as a node ID of the second IC; and
route the retrieved requested data block to the first IC, wherein the first IC is further configured to route the requested data block received from the second IC to the external source.

8. The system of claim 1, wherein:
a first IC of the plurality of ICs is configured to:
   transfer a first data block to a second IC of the plurality of ICs; and
   update a translation mapping maintained by the first IC to delete a logical block number of the transferred first data block, and
the second IC of the plurality of ICs is configured to update a translation mapping maintained by the second IC to add the logical block number of the transferred first data block.

9. The system of claim 8, wherein each IC of the plurality of ICs is configured to change a node ID of the transferred data block from a node ID of the first IC to a node ID of the second IC in response to the transfer of the first data block from the first IC to the second IC.

10. The system of claim 1, wherein:
a first IC of the plurality of ICs is configured to:
maintain a count of a number times a second IC of the plurality of ICs requests a first data block stored in a memory circuitry of the first IC; and
transfer the first data block to the second IC in response to determining that the count is greater than a threshold value.

11. A method comprising:
maintaining, with memory manager circuitry of at least one integrated circuit ("IC") of a plurality of ICs, a unique global identification ("ID") for a data block stored by the plurality of ICs, wherein the global ID for the data block comprises:
a node ID identifying an IC of the plurality of ICs which stores the data block, and
a logical block number of the data block;
maintaining, with the memory manager circuitry of the at least one IC, a translation mapping between a logical block number of a data block stored locally in a memory circuitry of the at least one IC and a physical portion ID of a portion of the memory circuitry of the at least one IC containing the locally stored data block; and
accessing, with the memory manager circuitry of the at least one IC, the portion of the memory circuitry of the at least one IC containing the locally stored data block in response to receiving a physical portion ID of the locally stored data block.

12. The method of claim 11, further comprising:
receiving, with a first IC of the plurality of ICs, a request from an external source for a data block identified by a global ID of the requested data block; and
determining a node ID and a logical block number of the requested data block based on the global ID of the requested data block.

13. The method of claim 12, further comprising:
retrieving the requested data block from a memory circuitry of the first IC in response to determining that the node ID of the requested data block is the same as a node ID of the first IC; and
routing the retrieved requested data block to the external source.

14. The method of claim 12, further comprising:
routing the request from the external source for the data block from the first IC to a second IC of the plurality of ICs in response to determining that the node ID of the requested data block is different from a node ID of the first IC.

15. The method of claim 14, further comprising:
selecting a route for routing the request based at least in part on the node ID of the requested data block.

16. The method of claim 14, further comprising:
selecting a route for routing the request based at least in part on a topology of interconnections between ICs of the plurality of ICs.

17. The method of claim 14, further comprising:
receiving, with the second IC, the request from the external source for the data block routed to the second IC by the first IC;
retrieving the requested data block from a memory circuitry of the second IC in response to determining that the node ID of the requested data block is the same as a node ID of the second IC; and
routing the retrieved requested data block from the second IC to the first IC, wherein the first IC is further configured to route the requested data block received from the second IC to the external source.

18. The method of claim 11, further comprising:
transferring a first data block from a first IC of the plurality of ICs to a second IC of the plurality of ICs; and
updating a translation mapping maintained by the first IC to delete a logical block number of the transferred first data block, and
updating a translation mapping maintained by the second IC to add the logical block number of the transferred first data block.

19. The method of claim 18, further comprising:
changing a node ID of the transferred data block maintained by each IC of the plurality of ICs from a node ID of the first IC to a node ID of the second IC in response to the transfer of the first data block from the first IC to the second IC.

20. The method of claim 11, further comprising:
maintaining a count of a number times a second IC of the plurality of ICs requests a first data block stored in a memory circuitry of a first IC; and
transferring the first data block from the first IC to the second IC in response to determining that the count is greater than a threshold value.

* * * * *